US008379216B2

(12) United States Patent
Schwartz et al.

(10) Patent No.: US 8,379,216 B2
(45) Date of Patent: Feb. 19, 2013

(54) SOLID STATE GYROLASER WITH CONTROLLED OPTICAL PUMPING

(75) Inventors: Sylvain Schwartz, Saint Remy les Chevreuse (FR); Gilles Feugnet, Palaiseau (FR); Francois Gutty, Chatellerault (FR); Etienne Bonnaudet, St Georges les Baillargeaux (FR); Mehdi Alouini, Saint Martin de Brethencourt (FR); Jean-Paul Pocholle, La Norville (FR)

(73) Assignee: Thales, Neuilly sur Seine (FR)

( * ) Notice: Subject to any disclaimer, the term of this patent is extended or adjusted under 35 U.S.C. 154(b) by 413 days.

(21) Appl. No.: 12/617,599

(22) Filed: Nov. 12, 2009

(65) Prior Publication Data

US 2010/0123901 A1 May 20, 2010

(30) Foreign Application Priority Data

Nov. 18, 2008 (FR) .................................... 08 06445

(51) Int. Cl.
*G01C 19/64* (2006.01)

(52) U.S. Cl. ........................................................ 356/459

(58) Field of Classification Search ............ 356/459–476
See application file for complete search history.

(56) References Cited

U.S. PATENT DOCUMENTS

| 5,076,694 | A * | 12/1991 | Aronowitz | 356/459 |
| 5,489,981 | A * | 2/1996 | Killpatrick et al. | 356/459 |
| 5,684,590 | A * | 11/1997 | Sanders et al. | 356/460 |
| 6,639,680 | B1 * | 10/2003 | Numai | 356/459 |
| 7,230,686 | B1 | 6/2007 | Schwartz et al. | |
| 7,319,513 | B2 | 1/2008 | Schwartz et al. | |
| 7,446,879 | B2 | 11/2008 | Feugnet et al. | |
| 7,474,406 | B2 | 1/2009 | Feugnet et al. | |
| 7,548,572 | B2 | 6/2009 | Schwartz et al. | |
| 7,561,275 | B2 | 7/2009 | Feugnet et al. | |
| 7,589,841 | B2 | 9/2009 | Schwartz et al. | |
| 2004/0202222 | A1 | 10/2004 | Pocholle et al. | |
| 2008/0043225 | A1 * | 2/2008 | Schwartz et al. | 356/73 |
| 2009/0116031 | A1 | 5/2009 | Schwartz et al. | |

FOREIGN PATENT DOCUMENTS

EP  1 890 107 A  2/2008

OTHER PUBLICATIONS

U.S. Appl. No. 12/097,429, filed May 7, 2006.

(Continued)

*Primary Examiner* — Tarifur Chowdhury
*Assistant Examiner* — Michael P Lapage
(74) *Attorney, Agent, or Firm* — LaRiviere, Grubman & Payne, LLP

(57) ABSTRACT

The general field of the invention is that of gyrolasers comprising at least one ring-shaped optical cavity comprising at least three mirrors, a solid state amplifying medium pumped by a laser diode whose optical emission power is determined by a current supply source, the cavity and the amplifying medium being such that two so-called contra-rotating optical modes propagate in opposite directions to each other within the said optical cavity, the gyrolaser being a class B gyrolaser, the gyrolaser also comprising means of measuring the difference in optical frequency existing between the two optical modes. The gyrolaser comprises means of measuring the total optical power circulating in the optical cavity and first means of control of the current delivered by the supply source in such a way as to maintain the total optical power substantially constant in a narrow spectral band centred on the relaxation frequency of the laser.

3 Claims, 1 Drawing Sheet

OTHER PUBLICATIONS

A.V. Dotsenko, et al., "Use of a Feedback Loop for he Stabilization of a Beat Regime in a Solid-State Ring Laser", Soviet journal of Quantum Electronics, Jan. 1, 1986, pp. 58-63.

Thomas J. Kane, "Intensity Noise in Diode-Pumped Single-Frequency Nd:YAG Lasers and its Control by Electronic Feedback", IEEE Photonics Technology Letters, Apr. 30, 1990.

* cited by examiner

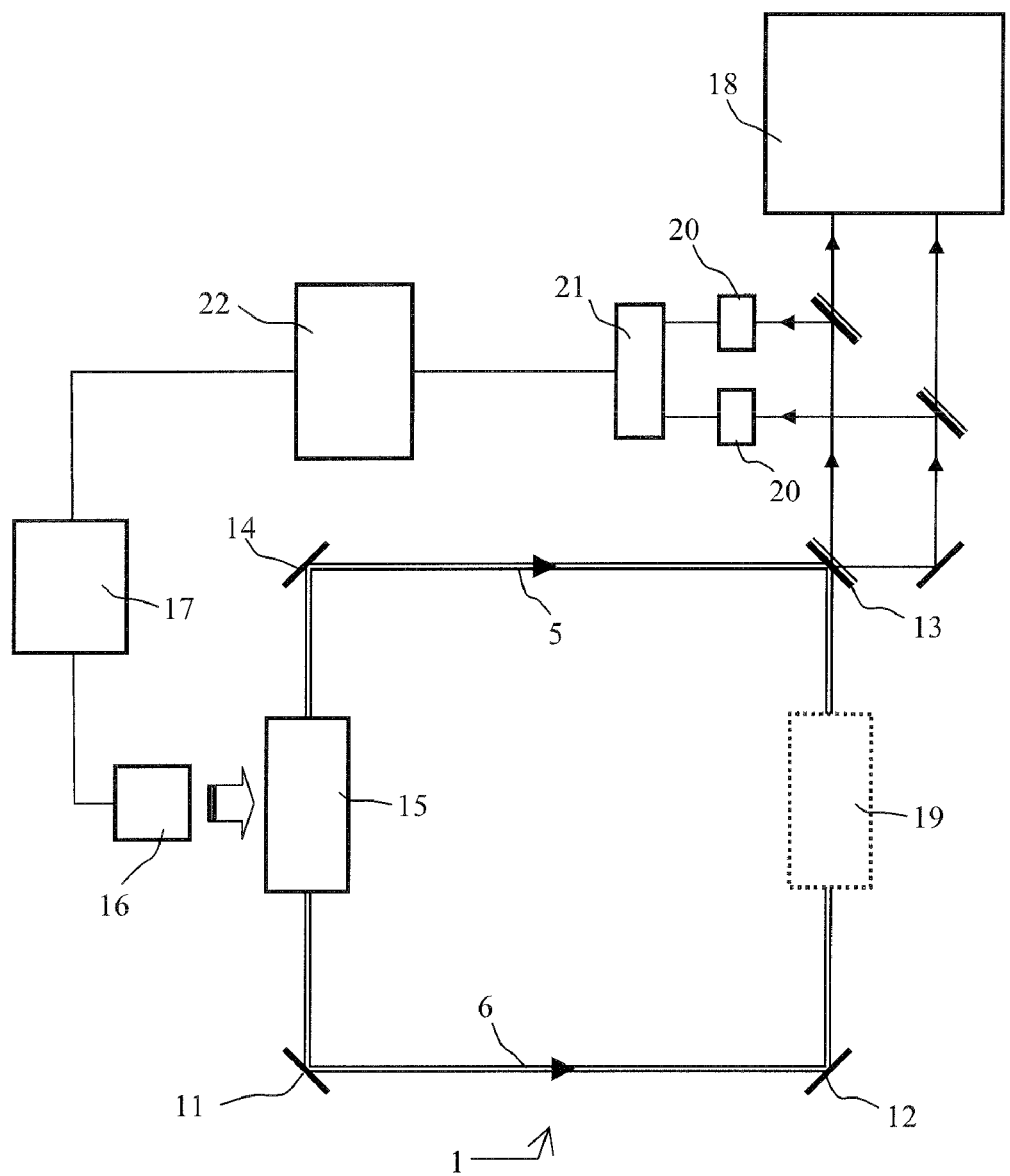

SOLID STATE GYROLASER WITH CONTROLLED OPTICAL PUMPING

PRIORITY CLAIM

This application claims priority to French Patent Application Number 08 06445, Solid State Gyrolaser with Controlled Optical Pumping, filed on Nov. 18, 2008.

BACKGROUND OF THE INVENTION

1. Field of the Invention

The field of the invention is that of solid state gyrolasers used for the production of inertial systems necessary for the navigation of certain types of vehicles, such as aircraft. Gyrolasers are optical rotation sensors based on the Sagnac effect. The Sagnac effect, which is well known to specialists in this technical field, is not described in detail here. It is simply recalled that, when two contra-rotating optical modes circulate in a ring laser having a rotational movement, their optical frequencies undergo a shift representative of the speed of rotation.

2. Description of the Prior Art

At present, commercially available gyrolasers use a gaseous mixture of helium and neon as an amplifying medium. This technology, which is difficult to implement, has a certain number of disadvantages. Also, at present substituting the gas amplifying medium with a solid state amplifying medium, such as, for example, a neodymium-yttrium-aluminium-garnet (Nd-YAG) crystal pumped by laser diodes is being considered. The feasibility of such gyrolasers has been successfully demonstrated. In this matter, reference will be made to the publications of S. Schwartz, G. Feugnet, P. Bouyer, E. Lariontsev, A. Aspect and J. P. Pocholle in Physics Review Letters 97, 093902 (2006) and of S. Schwartz, G. Feugnet, E. Lariontsev and J. P. Pocholle in Physics Review A 76, 023807 (2007). The inertial performance of such a device improves as its frequency response becomes more linear, that is to say a beat signal between the two contra-rotating modes whose frequency is proportional to the speed of rotation of the assembly is obtained over an operating range that is as wide as possible.

A first source of non-linearity of the frequency response in solid state lasers is related to the existence of population inversion system in the gain medium, induced by stimulated emission. It is established, in the above references, that the deviation Δf from the ideal frequency response through this gain system is given by the following equations (A):

$$\Delta f = \frac{\gamma \cdot \eta}{4\pi T_1 \Omega} \text{ with } \frac{\Omega}{2\pi} = \frac{4A}{\lambda L} \cdot \dot{\theta}$$

Where γ represents the rate of loss of intensity per unit time;
η is the relative pump excess above the pumping threshold;
$T_1$ is the response time of the population inversion;
A is the area written in the laser cavity;
λ is the mean wavelength of laser emission;
L is the length of the cavity;
$\dot{\theta}$ is the speed of rotation of the gyrolaser.

Putting the amplifying medium into longitudinal vibration makes it possible to avoid considerably the effects of the population inversion system described above. Additional information on this technique is available on referring to the patent FR 06 07394 issued on 26 Sep. 2008. Nevertheless, the stability of the pumping rate η remains an important criterion for the performance of solid state gyrolasers.

Another phenomenon capable of degrading the inertial performance is due to parametric resonances able to arise in the gyrolaser, related to the combined effects of the inertia of the gain medium and the excitation of the laser at the beat frequency when the latter is in rotation. It is in fact well known and is described, for example, in the book by A. Siegman entitled Lasers, University Science Books, Mill Valley, Calif. (1986), that certain lasers, called class B lasers for which the population inversion response time is very high in comparison with the other characteristic times, which are the lifetime of the coherences and the characteristic damping time of the cavity, exhibit a resonant response phenomenon about a certain characteristic frequency called the relaxation frequency and referenced $\omega_r/2\pi$ in the rest of the description. When the speed of rotation of the solid state gyrolaser is such that the beat frequency is equal to or very close to the relaxation frequency, the intensities of the modes emitted by the laser becomes very highly unstable, which prevents the observation of the beating and therefore strongly reduces the overall inertial performance. In particular, a diode-pumped solid state gyrolaser using an Nd-YAG amplifying medium is a class B laser and is therefore subjected to this phenomenon.

SUMMARY OF THE INVENTION

The gyrolaser according to the invention has at least one feedback loop which limits or eliminates a large proportion of these problems.

More precisely, the subject of the invention is a gyrolaser comprising at least one ring-shaped optical cavity comprising at least three mirrors, a solid state amplifying medium pumped by a laser diode whose optical emission power is determined by a current supply source, the cavity and the amplifying medium being such that two so-called contra-rotating optical modes propagate in opposite directions to each other within the said optical cavity, the gyrolaser being a class B gyrolaser, the gyrolaser also comprising means of measuring the difference in optical frequency existing between the two optical modes, characterized in that the gyrolaser comprises means of measuring the total optical power circulating in the optical cavity and first means of control of the current delivered by the supply source in such a way as to maintain the total optical power substantially constant.

Advantageously, the first control means are optimized to operate in a first frequency band substantially centred on the relaxation frequency of the laser and of width $1/(4\pi T_1)$, $T_1$ being the response time of the population inversion in the amplifying medium.

Advantageously, the gyrolaser comprises second means of control of the current delivered by the supply source optimized to operate in a second frequency band whose lower limit corresponds to the low frequencies close to direct current and whose upper limit corresponds to the relaxation frequency.

Advantageously, the first control means are periodically switched off in such a way as to allow the optical power to oscillate at the relaxation frequency of the laser, the gyrolaser comprising means of measuring the said frequency, means of calculating the effective pumping rate from the measurement of the said frequency and means of adjustment of the parameters of the second control means, as functions of the said pumping rate.

BRIEF DESCRIPTION OF THE DRAWINGS

The invention will be better understood and other advantages will appear on reading the following description, given in a non-limiting way and with reference to the appended FIG. 1 showing the block diagram of a gyrolaser according to the invention.

MORE DETAILED DESCRIPTION

It is advantageous, before describing an embodiment of a gyrolaser, to recall the functioning of a class B laser. In the context of a simplified model, a class B laser can be described by the two real parameters E and N respectively representing the electrical field inside the cavity and the population inversion or gain of the laser. These two parameters obey the following semi-conventional differential equations (B):

$$\frac{dE}{dt} = -\frac{\gamma}{2} \cdot E + \frac{\sigma l}{2T} \cdot NE \text{ and } \frac{dN}{dt} = W - \frac{N}{T_1} - \frac{aE^2N}{2T_1} \text{ where}$$

σ represents the effective laser emission cross-section;
l is the effective length of the gain medium;
T is the time taken by a photon to pass through the cavity;
W is the optical pumping rate;
with $$\eta = \frac{W\sigma l T_1}{\gamma T} - 1$$

and α being the saturation parameter.

With these notations, and furthermore introducing the lifetime of the coherences $T_2$, the conditions (C) for having a class B laser are written:

$$T_1 \gg T_2 \text{ and } T_1 \gg \gamma^{-1}$$

As a non-limiting example, for a solid state ring laser whose cavity has a perimeter of 30 centimetres and exhibits a loss rate of 2% per turn, which corresponds to a γ of $2.10^7.s^{-1}$ and whose amplifying medium is a Nd-YAG crystal where $T_1$=230 μs and $T_2 = 10^{-11}$s, the inequalities (C) are correctly satisfied and this laser is consequently a class B laser.

A pair of static solutions of the equations (B) corresponding to the laser emission above the threshold is given by the expressions (D):

$$N_{st} = \frac{\gamma T}{\sigma l} \text{ and } aE_{st}^2 = 2\eta$$

If a sinusoidal disturbance is applied starting from this static state, for example using a source term of the type f cos ωt in the first equation of the system (B), and assuming that the disturbance is very small with respect to the other terms of this equation, it is then possible to write the new solution of the equations of the laser as the sum of the static solution (D) and a correction term that is very small in comparison with the static solution and varying sinusoidally at the angular frequency ω. The pair of equations (E) is obtained:

$$N = N_{st} + n \cos(\omega t + \Phi) \text{ and } E = E_{st} + e \cos(\omega t + \Phi')$$

Close to resonance and within the limit of the low pumping rates, an equation (F) is obtained which relates the sinusoidal disturbance e induced by the electrical field of the laser E and the sinusoidal excitation force f:

$$e = \frac{f}{\sqrt{1/T_1^2 + 4(\omega - \omega_r)^2}} \text{ where } \omega_r = \sqrt{\frac{\gamma\eta}{T_1}}$$

The equation (F) shows that the laser system responds in a resonant manner to a sinusoidal excitation, the maximum sensitivity being obtained in the vicinity of the relaxation frequency $\omega_r/2\pi$. The typical width of this response is moreover given by the expression $1/2T_1$, where $T_1$ is the inverse of the lifetime of the population inversion. With the previously given typical values, and η=0.2, $\omega_r/2\pi \approx 21$ kHz is obtained for resonance width of the order of 350 Hz.

The system therefore preferably responds to the disturbances situated in a narrow band of frequencies centred on the relaxation frequency of the laser. The latter is therefore especially sensitive to disturbances occurring in this frequency band. Such a disturbance can for example originate from mechanical vibrations from outside of the device. It can also, in the case of a gyrolaser, originate from inside the laser under the effect of the rotation. In fact, the frequency difference between the two contra-rotating modes is given, as a first approximation, by the following formula (G):

$$\frac{\Omega}{2\pi} = \frac{4A}{\lambda L} \cdot \dot{\theta}$$

A parametric resonance, capable of destabilizing the laser and therefore of disturbing the measurement of the rotation, occurs when $\Omega \approx \omega_r$, which corresponds to $\dot{\theta} \approx \dot{\theta}_{cr}$, the critical speed of rotation $\dot{\theta}_{cr}$ being given by the following formula (H):

$$\dot{\theta}_{cr} = \frac{\lambda L \omega_r}{8\pi A}$$

With the previously given parameters and assuming a laser whose square cavity has a perimeter of 30 centimetres and emitting at a wavelength of 1.06 μm, the following value is obtained: $\dot{\theta}_{cr}$=17 deg/s.

Likewise, $\Delta\dot{\theta}_{cr}$=0.3 deg/s is derived from the width of the resonance peak calculated above. Such a range of disappearance of the beating therefore corresponds to an additional "blind zone" of several tenths of a degree per second and situated inside the operating zone of the gyrolaser, which necessarily induces a great degradation of the inertial performance.

In order to correct this problem, the gyrolaser according to the invention comprises at least a first feedback loop acting on the supply current of the optical pumping laser diode. More precisely, a solid state laser according to the invention such as shown in FIG. 1 comprises:
- a ring-shaped optical cavity 1 comprising four mirrors 11, 12, 13 and 14. The substantially square shape of the optical cavity shown in FIG. 1 is of course given only as an indication. The cavity could also be of triangular or rectangular shape, contained or not contained in a plane;
- a solid state amplifying medium 15 pumped by a laser diode 16 whose optical emission power is determined by a current supply source 17, this medium can, for example, be an Nd-YAG crystal. The representation of the diode in FIG. 1 is of course purely formal. The amplifying medium can be pumped by several diodes arranged in such a way as to optimize the conversion efficiency, the homogeneity of the amplification, the polarization states, etc.;

the cavity 1 and the amplifying medium 15 being such that two optical modes 5 and 6, called contra-rotating modes, propagate in opposite directions to each other inside the said optical cavity, the gyrolaser being a class B laser, according to the definition given in this description;

means 18 of measuring the optical frequency difference existing between the two optical modes. These means most often consist, on the one hand, of interferometric devices making it possible to cause the two contra-rotating modes to interfere with each other and, on the other hand, optoelectronic means making it possible to analyze the frequency of the interference signal. These means are well known to gyrolaser specialists and will not be described in detail in this description;

various optical means 19 making it possible to reduce or to eliminate the optical coupling between the two contra-rotating modes, these various means are generally based either on non-reciprocal optical effects like the Faraday effect or on polarization, the two contra-rotating modes then having different polarizations. The device according to the invention is compatible with these means;

means 20 and 21 of measuring the total optical power circulating in the optical cavity. These means can, for example, be constituted by two photo-detectors onto which are sent a small fraction of the contra-rotating modes, the electronic signals coming from these photo-detectors then being summed electronically;

first means 22 of controlling the current delivered by the supply source in such a way as to maintain the total optical power substantially constant.

These control means preferably operate over a frequency range centred on the relaxation frequency and whose minimum width is given by $1/4\pi T_1$, the value of the relaxation frequency increasing with the pumping rate. The error signal representing the total intensity of the laser is constituted by the incoherent sum of the intensities of the two contra-rotating beams emitted by the laser. The pump current of the diode is then acted upon in order to oppose the variations in the total power about the frequency $\omega_r$. Such a device makes it possible to avoid a runaway of the laser rapidly leading to its destabilization and on the contrary maintains the two intensities in a stable operating mode.

It should be noted that there is a method making it possible to eliminate the relaxation oscillations of the spectrum of solid lasers. Fuller information on this method will be found in the publications by T. Kane which appeared in IEEE Photonics Technology letters 2, 244 (1990) and by C. Harb, M. Gray, H.-A. Bachor, R. Schilling, P. Rottengatter, I. Freitag and H. Welling, IEEE journal of Quantum Electronics 30 (12), 2907 (1994). However, there are several fundamental differences between the device according to the invention and this prior art as explained below:

The orders of magnitude are not the same. In the device according to the invention, it is a matter of preventing a runaway of the laser able to result in a modulation of the intensities going up to 100% and of maintaining the laser in a state of equilibrium sufficient for it to be possible to make a measurement. Whereas the devices described in the preceding documents make it possible to eliminate small variations, typically of less than 1% of the intensity in order to remove them from the noise spectrum of a laser which is moreover naturally in a continuous state of equilibrium;

The technical field is different. The lasers of the publication by Kane and Harb are not gyrolasers but are ring lasers with contra-rotating modes;

Finally, the field of use is not the same. In the context of this invention it is a matter of inertial sensors, whereas the publications of Kane and Harb deal with master lasers of great spectral purity and having low noise.

The correct functioning of the device is guaranteed by the fact that the laser has maximum sensitivity, and therefore the feedback loop has maximum efficiency, around the relaxation frequency which is precisely the frequency at which the laser must be corrected. Naturally, the control means take account of the amplitude and phase response of the gyrolaser to a sinusoidal modulation of the pump rate, the orders of magnitude of the control parameters being able to be determined experimentally at the start.

A second phenomenon necessitating an active control of the power delivered by the optical pumping diode in a solid state gyrolaser concerns the effect of spatial variations of the gain on the frequency response, such variations being capable of introducing a coupling between the contra-rotating modes of the laser cavity by the "system effect". This non-linearity of the frequency response induced by the gain whose value is given by the equation (A) is in particular proportional to the pumping rate $\eta$. As mentioned, particular devices can be used for reducing this value, for example putting the gain medium into longitudinal vibration. It can be shown that under certain conditions in particular concerning the vibration frequency of the gain medium, this non-linearity is rewritten $\Delta f = \gamma \eta J_0 (kx_m)/(4\pi T_1 \Omega)$ where $k=2\pi/\lambda$ and where $x_m$ is the peak to peak amplitude of the movement. Although compliance with the condition $J_0(kx_m) \ll 1$ makes it possible to greatly reduce the effect of this non-linearity, the residual error due to it is also none the less proportional to the pumping rate and also necessitates control of the mean value of the pumping rate.

The gyrolaser according to the invention can therefore comprise a second feedback loop whose purpose is to maintain the mean value of the optical pumping rate in the solid state gyro laser constant, in order to limit the degradation of the performance induced by the non-uniform nature of the gain; the field of action of this loop particularly relates more to the low frequencies and in any case the frequencies below $\omega_r$.

It is therefore advantageous to make use of the information given by the measurement of the relaxation frequency in order to estimate more precisely the effective pumping rate of the laser for the error signal of the second feedback loop. As it is possible for such a measurement to be made more difficult by the inclusion of the first feedback loop, the latter can be interrupted periodically according, for example, to a low frequency sampling in order to allow this measurement.

What is claimed is:

1. A gyrolaser-comprising at least one ring-shaped optical cavity comprising at least three mirrors, a solid state amplifying medium pumped by a laser diode whose optical emission power is determined by a current supply source, the cavity and the amplifying medium being such that two contra-rotating optical modes propagate in opposite directions to each other within the optical cavity, the gyrolaser being a class B gyrolaser, the gyrolaser also comprising means of measuring the difference in optical frequency existing between the two optical modes, wherein the gyrolaser comprises:

a. means of measuring the total optical power circulating in the optical cavity, these means of measuring the total optical power comprising:

i. two photo-detectors onto which are sent a fraction of the contra-rotating optical modes;

ii. obtaining a summed signal by summing electronic signals from the photo-detectors; and b. a first feedback loop acting on the current of the laser diode to control the current delivered by the supply source in such a way as to maintain the total optical power substantially constant, the summed signal from the two photo-detectors controlling the value of the current; and c. wherein the first feedback loop is optimized to operate in a first frequency band substantially centered on a relaxation frequency of the laser and of width $1/(4.\pi.T_1)$, $T_1$ being the response time of the population inversion in the amplifying medium.

2. The gyrolaser according to claim 1, further comprising a second feedback loop acting on the current of the laser diode to control the current delivered by the supply source optimized to operate in a second frequency band whose lower limit corresponds to the low frequencies close to direct current and whose upper limit corresponds to the relaxation frequency.

3. The gyrolaser according to claim 1, wherein the first feedback loop is periodically switched off in such a way as to allow the optical power to oscillate at the relaxation frequency of the laser, the gyrolaser a comprising means of measuring the relaxation frequency, means of calculating the effective pumping rate from the measurement of the relaxation frequency and means of adjustment of the parameters of the second feedback loop, as functions of the pumping rate.

* * * * *